US005200586A

United States Patent [19]

Smith et al.

[11] Patent Number: 5,200,586

[45] Date of Patent: Apr. 6, 1993

[54] FIVE GEAR ISOLATING MECHANISM FOR BYPASS ISOLATION SWITCHES

[75] Inventors: George A. Smith, N. Huntingdon; Thomas K. Fogle, Shaler, both of Pa.

[73] Assignee: Westinghouse Electric Corp., Pittsburgh, Pa.

[21] Appl. No.: 738,713

[22] Filed: Jul. 31, 1991

[51] Int. Cl.⁵ .......................... H01H 9/26; H02J 9/00

[52] U.S. Cl. .................................. 200/50 C; 200/18; 307/64

[58] Field of Search ......... 200/17, 18, 50 C, 500–502; 307/64, 80

[56] References Cited

U.S. PATENT DOCUMENTS 3,778,633 11/1973 DeVisser et al. .................... 307/64
4,157,461 6/1979 Witkor .................................. 200/18
4,295,054 10/1981 Kovatch et al. ...................... 307/80
4,760,278 7/1988 Thomson ............................. 307/64
5,081,367 1/1992 Smith et al. .......................... 307/64

OTHER PUBLICATIONS

Color brochure entitled "Westinghouse Transfer Switches", Aug. 1983.
Brochure entitled "Westinghouse Transfer Switch Equipment", Jul. 1990.
Brochure entitled "Transfer Switch Equipment 30 through 4000A", Sep. 1990.
Brochure entitled "Instructions for Transfer Switches—Breaker Type Construction", Mar. 1983.

*Primary Examiner*—J. R. Scott
*Attorney, Agent, or Firm*—M. J. Moran

[57] ABSTRACT

A mechanism for bypass isolation switches of the type comprised of at least three circuit interruption devices each having a handle has at least three switch gears, one positioned over each circuit interruption device and having either a drive gear or a spacer gear therebetween. A cam having a mouth which engages the handle of the circuit interruption device is eccentrically mounted on each switch gear. A stop is provided on at least one gear to permit the gears to rotate only 180°. Since the drive, spacer and switch gears are interconnected, the cams must move or not move simultaneously. As a result, the at least three circuit interruption devices are operated simultaneously.

11 Claims, 4 Drawing Sheets

FIVE GEAR ISOLATING MECHANISM FOR BYPASS ISOLATION SWITCHES

BACKGROUND OF THE INVENTION

1. Field of the Invention

This invention relates to a mechanism for operating a series of isolation switches that are integral components of bypass isolation switches.

2. Background Information

In many installations it is common to have an alternate AC power source in the event that commercial power is lost or becomes unreliable. Such an alternate power source often comprises for instance an AC generator driven by an internal combustion engine. For switching between sources a transfer switch disconnects one power source and connects the other.

Typically a transfer switch is comprised of two circuit interrupting devices, such as two circuit breakers or two molded case switches or one of each. One switch or breaker is used for the normal power source and the second switch or breaker is used for the emergency power source. In this arrangement one circuit interrupting device is always in the OFF position when the second circuit interrupting device is in the ON position. Typically, the two circuit interrupting devices have a handle which is used to change the circuit interrupting device from an OFF position to an ON position and may operate through a RESET position.

The art has connected the two circuit interrupting devices together for simultaneous, mutually opposing operation in two ways. First, a bar has been placed between the handles which either pivots around a central point or moves along a longitudinal axis through the circuit interrupting devices. The bar arrangement provides no mechanical advantage and thus is not practical for gang operation of three or more large circuit interrupting devices. That is so because the handles on such large circuit interrupting devices are spring biased with a stiff spring. Second, a three gear mechanism which is manually operated or powered by an unidirectional motor has been used to activate two circuit interrupting devices in a transfer switch. The center gear drives two outer spur gears. Nylon rollers are mounted eccentrically on each of the outer spur gears, which drives an associated cam. The cams travel vertically on guide rods attached to the mechanism's housing. Each cam engages a handle of a circuit interrupting device. In this mechanism the gears can rotate 360° and the cams will move in opposite directions relative to one another. This mechanism can provide a mechanical advantage. However, because of the arrangement of gears it is not able to turn both circuit interrupting devices to the same position, i.e., both OFF or both ON.

Many systems also include a bypass isolation switch in addition to a transfer switch. A bypass isolation switch is used to first completely isolate the transfer switch from both power sources as well as from the load. Secondly, after isolating the transfer switch the attendant power source is reconnected to load through the appropriate bypass switch. Now the transfer switch may be safely removed for routine maintenance.

An isolation switch is typically comprised of three circuit interrupting devices that may be gang operated in order to simultaneously isolate the transfer switch from the normal power supply, emergency power supply and the load. A key lock can be provided such that the key is captive until the isolation switch is locked in the isolated position. Once the isolation switch is locked in the isolated position the key may be removed to unlock the appropriate bypass switch.

A bypass switch is typically comprised of two circuit interrupting devices that are of the same type of unit as is used in the respective transfer switch circuit interrupting device. One device is provided for bypassing to the normal power source and the other for bypassing to the emergency power source. Each circuit interrupting device is provided with a key lock such that only one of the bypass circuit interrupting devices may be unlocked and turned to the ON position by using the key from the locked isolation switch. The key is captive in this lock and may be not removed until the bypass switch is turned to the OFF position and locked.

The commercially available circuit interruption devices which are used as isolation switches have three positions: ON, OFF and RESET. When the circuit interruption device is in an ON position and a short circuit or other electrical failure occurs to automatically open the circuit interruption devices, the device will automatically go to an intermediate position between the ON position and the OFF position. To reactivate the switch one must push the handle to a RESET position and then return it to an ON position. In most circuit interruption devices the OFF position of the handle is located between the ON position and the RESET position. If the handle is held in an ON position when an automatic opening occurs the device will still disconnect. Holding the switch handle in an ON position will not prevent the circuit interruption devices from automatically opening. Westinghouse molded case circuit interruption devices are commonly used in these switching applications. It requires some force to move the handle of the Westinghouse circuit interruption devices and other commercially available alternative circuit interruption devices from an ON position, to an OFF position to a RESET position. If one were to interconnect the handles of three such circuit interruption devices with a bar, it would require considerable force to activate all three circuit interruption devices simultaneously. Indeed, most workmen would be unable to move all three switches together or find that task to be very difficult. Consequently, there is a need for an isolating mechanism that can be easily operated by an average person to simultaneously move the levers of three circuit interruption devices in an isolation switch from an ON position, to an OFF, to a RESET position.

SUMMARY OF THE INVENTION

We provide a five gear isolating mechanism for bypass isolation switches comprised of five gears mounted in a housing which can fit over an electrical cabinet having three circuit interruption devices arranged along a line. Our mechanism includes one drive gear, one spacer gear, and three switch gears. These gears are arranged in the order of first switch gear, drive gear, second switch gear, spacer gear, third switch gear. With that arrangement all of the switch gears will turn in the same direction at the same time. For each switch gear we provide a cam driven by the switch gear which engages the handle of a circuit interruption device. The drive gear is mounted on a stub shaft to which an operating handle is connected. The combination of operating handle and gear mechanism permits three circuit interruption devices in an isolation switch to be activated simultaneously using a reasonable amount of force. With this mechanism any workman can easily operate an isolation switch comprised of three circuit interruption devices.

DESCRIPTION OF THE PREFERRED EMBODIMENTS

Figure 1:
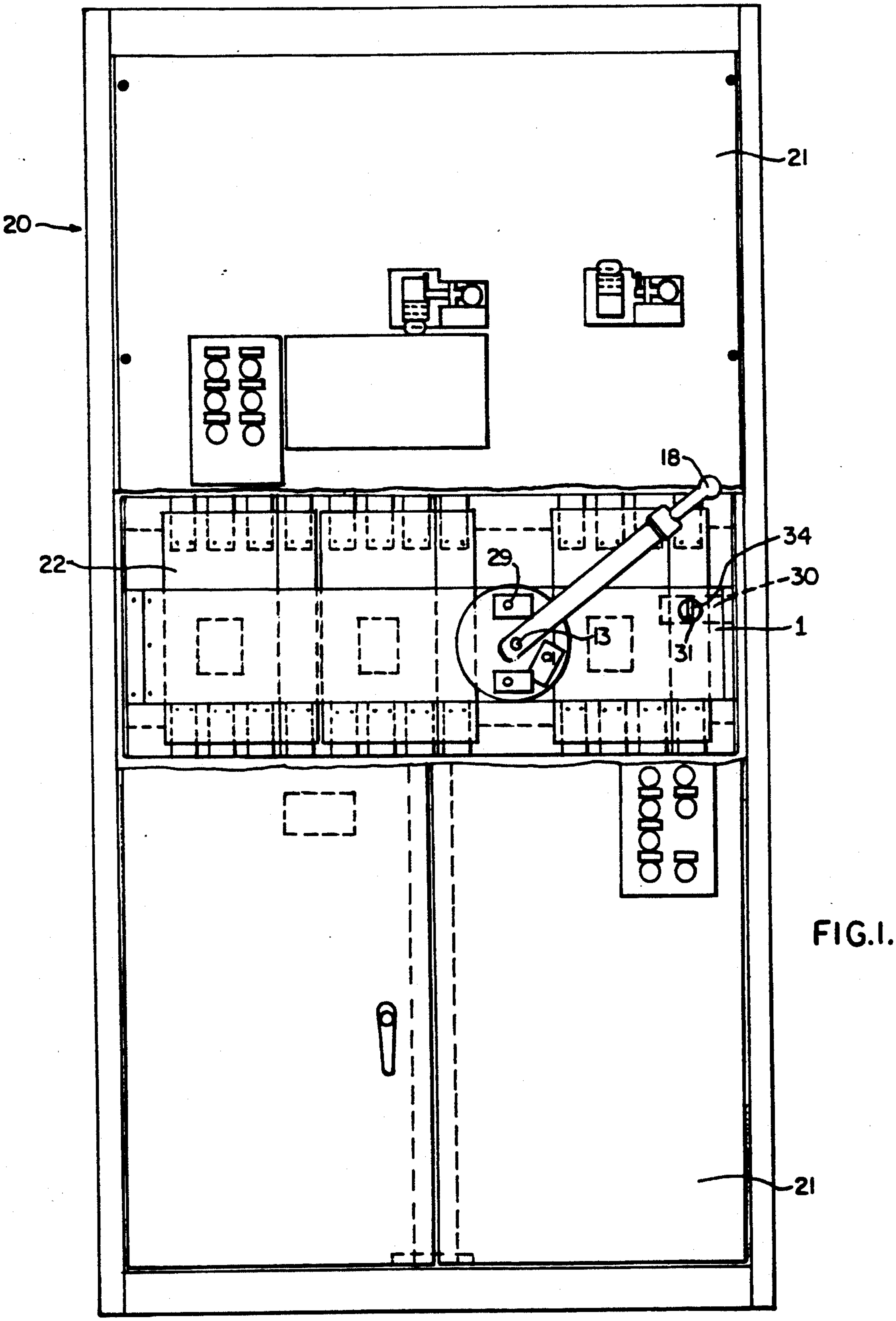
FIG. 1 is a front view of an electrical cabinet having an isolation switch comprised of three parallel circuit interruption devices and our five gear isolating mechanism mounted behind the cabinet face over the circuit interruption devices.

Shown in FIG. 1 is a conventional electrical cabinet 20 in which we have mounted our isolating mechanism over an isolation switch comprised of three circuit interruption devices 22. The front panel 21 of the electrical cabinet has been cut away to expose a portion of the circuit interruption devices 22. Our isolation mechanism contains a housing 1, the front of which can be seen in FIG. 1. A stub shaft 13 extends through the housing. Handle 18 is connected to that stub shaft. We prefer to provide indicia 29 on the housing showing the ON, OFF and RESET positions of the handle. In addition, we prefer to provide a key lock mechanism 30 shown in chain line at one end of the housing. A key 34 fits in key hole 31 of the key lock.

Figure 2:
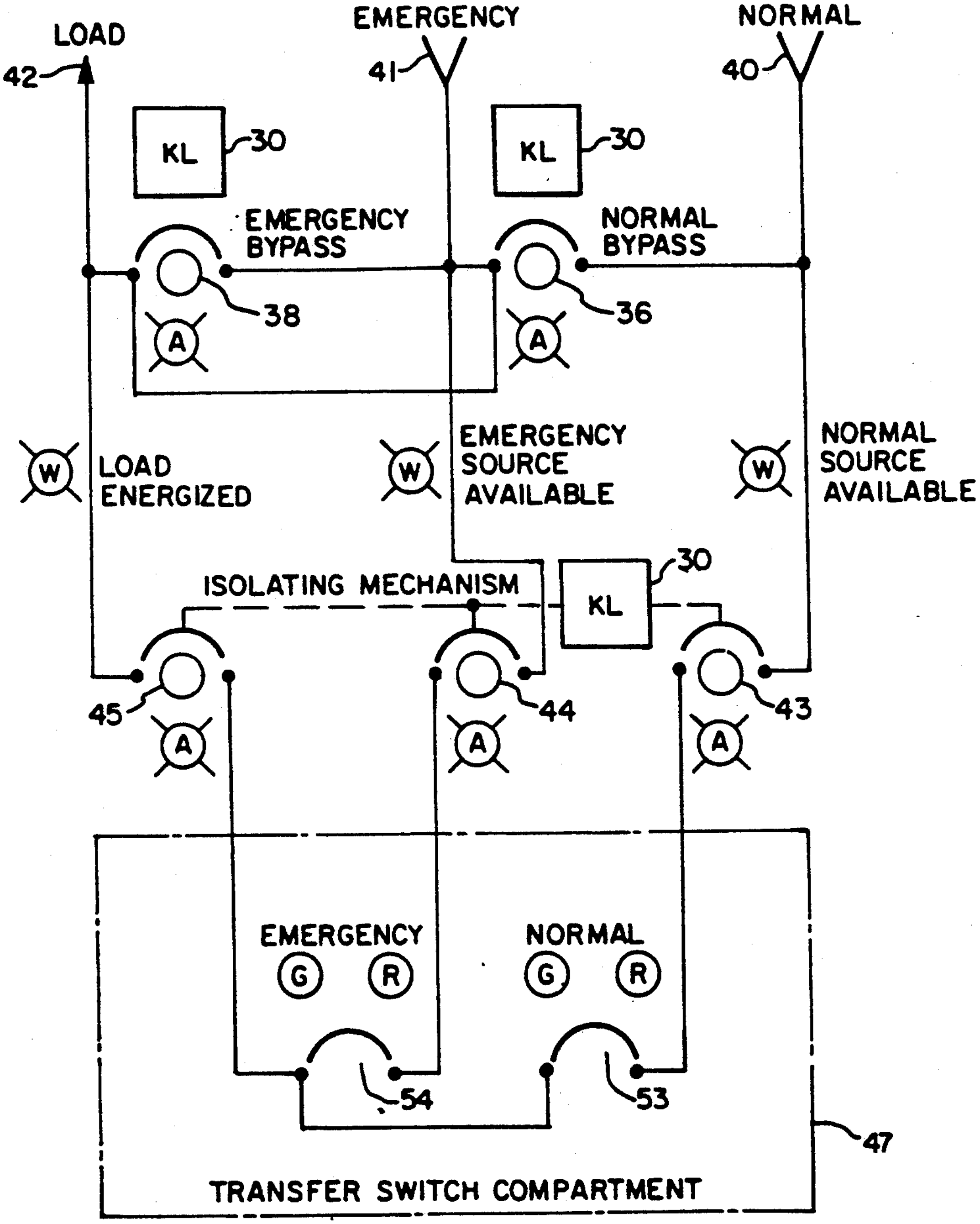
FIG. 2 is a circuit diagram of a common circuit in which our isolating mechanism is utilized.

Before describing the operation of our mechanism, let us review the circuit of FIG. 2 which is the type of circuit on which our mechanism is used. Turning to FIG. 2 we see a normal power source 40, emergency power source 41 and load 42. During normal operation power will travel from normal power source 40. Isolation switch circuit interruption devices 43, 44 and 45 will be in the ON position. In addition, circuit interruption device 53 in transfer switch compartment 47 also will be ON. Thus, power will travel from the normal power source 40 through circuit interruption devices 43, 53 and 45 to load 42. If emergency power is called for, circuit interruption device 53 would be turned OFF and circuit interruption device 54 would be turned ON. In that event, emergency power would travel through circuit interruption devices 44, 54 and 45 to load 42. If one wanted to isolate the transfer switch compartment 47 from the circuit one would turn circuit breakers 43, 44 and 45 OFF and then activate either the normal bypass switch 36 or the emergency bypass switch 38. Each of those bypass switches is usually governed by a key lock as indicated by the boxes 30. A single key is used for the key locks of the emergency bypass, normal bypass and isolating mechanism. The key can only be removed if the switch is in an OFF position. Thus, it will not be possible to have both the normal power source and the emergency power source supplying power to the load at the same time.

Figure 3:
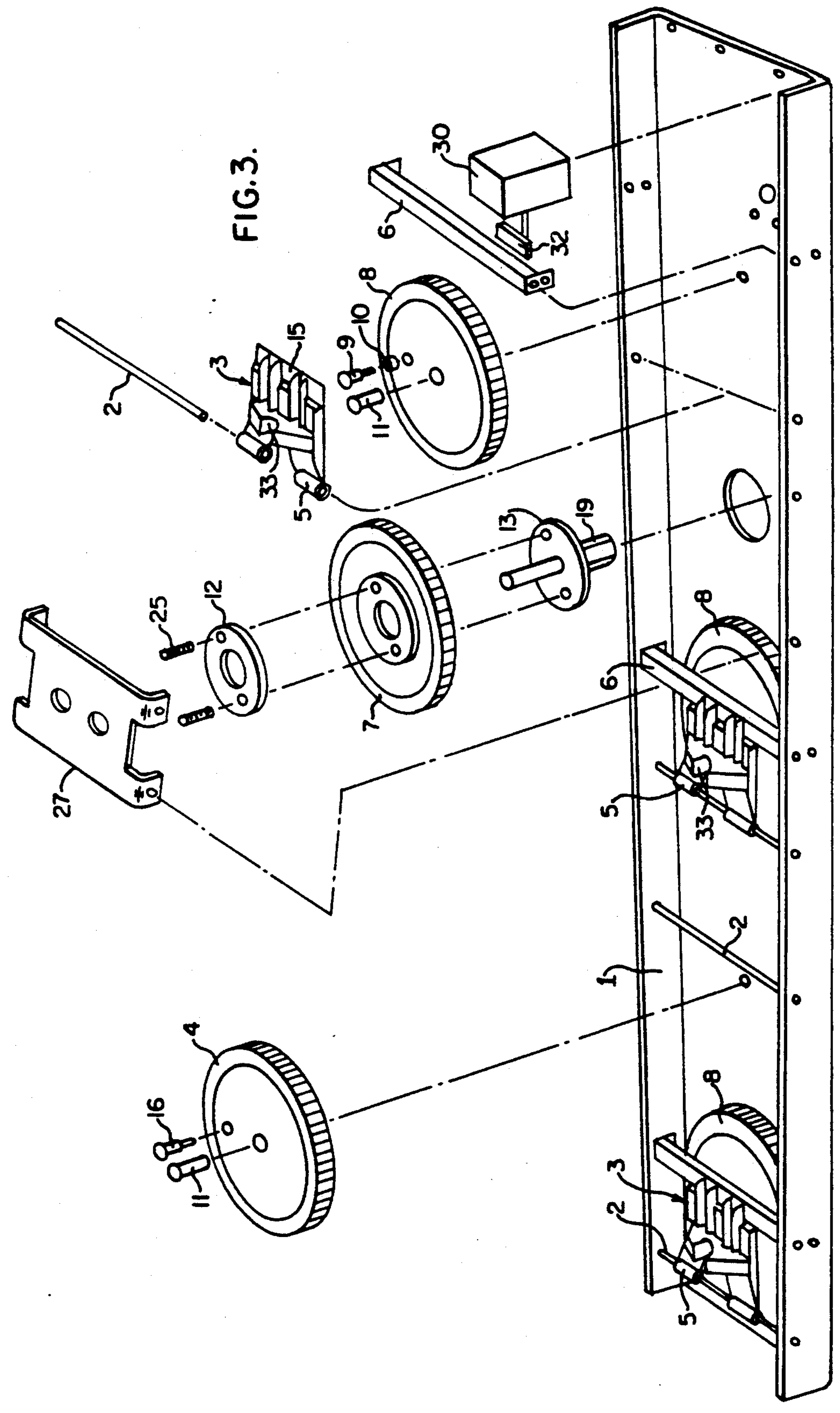
FIG. 3 is an exploded view of our isolating mechanism.

Turning to FIG. 3, we provide an isolating switch mechanism having a housing 1 in which three switch gears 8, drive gear 7 and spacer gear 4 are mounted. Stub shaft 13 is connected to the drive gear 7 using screws 25 and washer 12. We prefer to provide a cover, 27 with a stub shaft beaming surface over the drive gear 7. As shown in FIG. 1, handle 18 connects to end 19 of the stub shaft 13. End 19 preferably has splines which fit into mating slots (not shown) of the handle 18. The spacer gear 4 and switch gears 8 are mounted to the, housing with axles 11. Behind each of the switch gears 8 and the spacer gear 4 we provide a rod 2. Those rods, which are positioned over a switch gear, pass through sleeves 5 of a cam 3. Each cam 3 is connected to a roller 10 through a screw 9. We also provide a cross bar 6 for each switch gear 8. Fingers 15 extend from one side of the cam 3 to overlay the cross bar 6. We prefer to provide a stop pin 16 on the spacer gear 4. The stop pin 16 is positioned so that the gears may only turn 180°.

Figure 4:
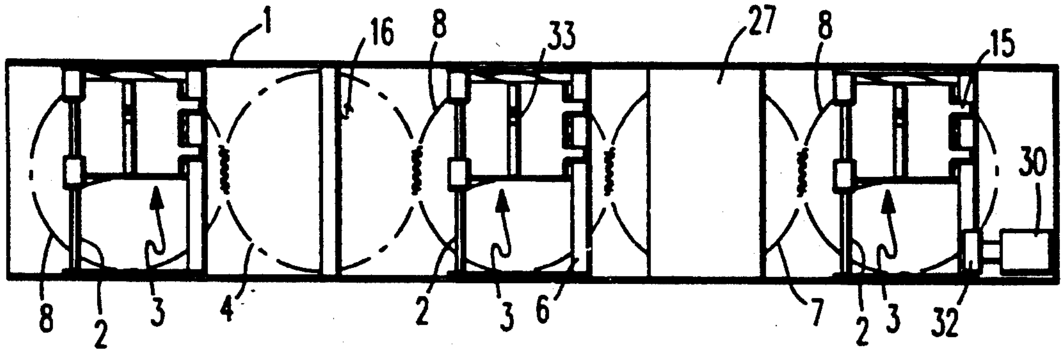
FIG. 4 is a rear perspective view of our isolating mechanism in an ON position.
Figure 6:
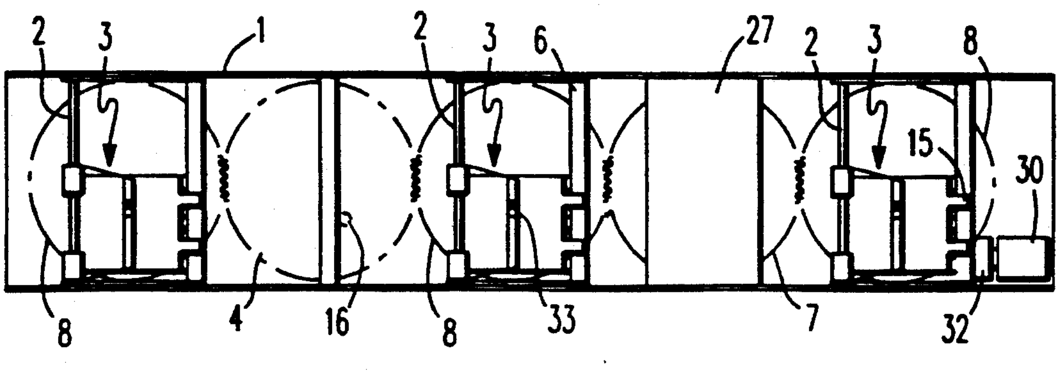
FIG. 6 is a rear perspective view of our isolating mechanism in a RESET and locked position.

This can be seen by comparing the position of the stop pin 16 on spacer gear 4 in FIGS. 4 and 6.

Turning to FIG. 4 we see the rear of our mechanism in an ON position. At that point stop pin 16 on spacer gear 4 is abutting rod 2 over the spacer gear. The cams 3 are in a top position. Mouth 33 of each cam 3 engages a handle (not shown) in a circuit interruption device of the transfer switch.

Figure 5:
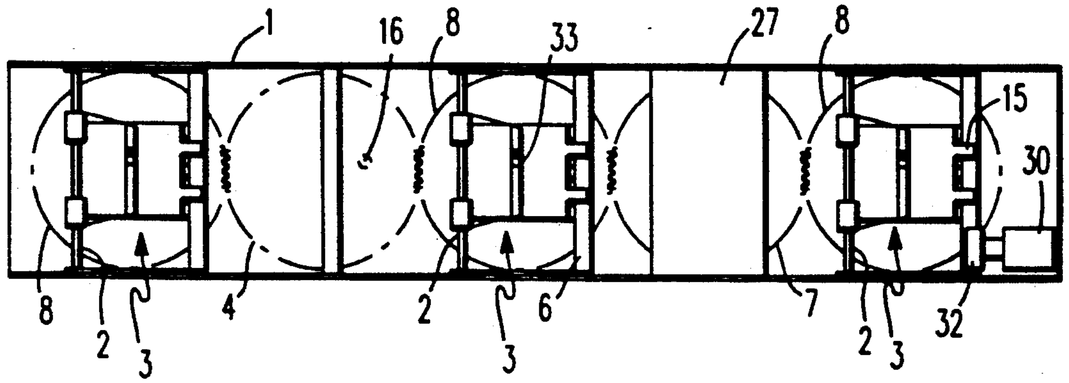
FIG. 5 is a rear perspective view of our isolating mechanism in an OFF and locked position.

In FIG. 5 the drive, spacer and switch gears 4, 7 and 8 have moved the cams to an OFF position. In addition key lock 30 has moved lock plate 32 over the cross bar 6 on the the switch gear 8 which is adjacent the key lock 30. When the lock plate 32 is so positioned as shown in FIG. 3, it prevents the cam 3 attached to that switch gear from moving to the ON position of FIG. 4. This plate 32 prevents the cam 3 from moving to an ON position shown in FIG. 4. Since all of the gears 4, 7 and 8 are interconnected, the cams 3 must move or not move simultaneously. Accordingly, by preventing the first cam from moving to an ON position we have locked the entire mechanism in an OFF position. The other cams cannot move to an ON position. In FIG. 6 the gears have turned to move the cams to a RESET position. At this point stop pin 16 on spacer gear 4 abuts a lower portion of rod 2. From the sequence of FIGS. 4, 5 and 6, it should be apparent that rotating the handle counterclockwise advances the mechanism from the ON position to the OFF position and then into the RESET position (if necessary). The handle must be rotated clockwise to move the circuit interruption device from the RESET and OFF positions to an ON position. Consequently, with our mechanism there is one direction for turning the isolation switch ON and an opposite direction for turning the isolation switch OFF.

Although we have illustrated the drive gear as distinct from the switch gears, one could connect the handle or other drive means to a switch gear thereby having a single gear function as both a switch gear and a drive gear.

There may be an occasion in which an isolation switch has more than three circuit interruption devices. Our isolation switch mechanism could be enlarged for such a situation by adding one spacer gear and one switch gear for each additional circuit interruption device.

Although we have illustrated and described a present preferred embodiment of our isolating mechanism for a bypass isolation switch, it should be understood that our invention is not limited thereto but may be variously embodied within the scope of the following claims.

We claim:

1. A mechanism for bypass isolation switches of the type having at least three adjacent circuit interruption devices each circuit interruption device having a handle which can be in one of an ON position, an OFF position and a RESET position comprising:

a) a housing;

b) at least three switch gears mounted on the housing such that there is one switch gear for each circuit interruption device;

c) at least one spacer gear mounted on the housing and engaging two of the at least three switch gears;

d) a drive gear mounted on the housing and being sized and positioned to drive the switch gears;

e) at least three cams each cam eccentrically connected to a switch gear such that there is one cam adjacent to each switch gear, each cam having a mouth sized and positioned to receive a handle of a circuit interruption device;

f) drive means connected to the drive gear; and g) lock means attached to the housing and having a stop member positioned to extend to a position adjacent one cam and when so positioned prevent the cam from moving from one of an OFF position to an ON position and an ON position to an OFF position.

2. The mechanism of claim 1 also comprising a guide attached to the housing and movably connected to one cam so that the cam moves relative to the guide.

3. The mechanism of claim 2 wherein the guide is a rod.

4. The mechanism of claim 1 wherein the drive means is an operating handle.

5. The mechanism of claim 1 also comprising at least one cross bar connected to the housing and positioned adjacent to a switch gear and a cam attached to the switch gear for guiding movement of the cam.

6. The mechanism of claim 5 wherein at least one cam has fingers which fit over the cross bar.

7. The mechanism of claim 1 wherein the circuit interruption devices are in a circuit having bypass switches having key locks also comprising a key which fits all the key locks and the lock means.

8. The mechanism of claim 7 wherein the key is captive in the lock means when the circuit interruption devices are in an ON position.

9. The mechanism of claim 1 also comprising a) at least one cross bar connected to the housing and positioned adjacent to a switch gear; and b) at least one finger attached to a cam and fitted over a cross bar wherein the stop member extends over a cross bar when the lock means is in a locked position to prevent movement of the at least one finger attached to a cam thereby locking the mechanism and can retreat from over the cross bar thereby unlocking the mechanism.

10. The mechanism of claim 1 also comprising at least one stop pin attached to one of a drive gear and a spacer gear and positioned to restrict movement of the drive gear by engaging a guide attached to the housing and passing over the drive gear.

11. The mechanism of claim 10 wherein the stop pin and guide are positioned to permit the switch gears to rotate not more than 180°.

* * * * *